July 8, 1947. W. J. FOSTER 2,423,592
AIR FLOW CONTROL FOR CRANKCASE VENTILATION
Filed Nov. 10, 1942

Inventor
William J. Foster
By Blackmore, Graves & Hint
Attorneys

Patented July 8, 1947

2,423,592

UNITED STATES PATENT OFFICE 2,423,592

AIR FLOW CONTROL FOR CRANKCASE VENTILATION

William J. Foster, Flint, Mich., assignor to General Motors Corporation, Detroit, Mich., a corporation of Delaware Application November 10, 1942, Serial No. 465,181

30 Claims. (Cl. 123—119)

This invention relates to ventilation and has particular reference to the ventilation of the crankcase and oil pan of the internal combustion engine used on automotive vehicles.

It is known that vapors of oil, gasoline, and water are found in the crankcase and oil pan of an internal combustion engine, and as the water vapor in time will condense to form water which will become mixed with and render less efficient the oil in the lubricating system, this water vapor and the gasoline vapor are regarded as deleterious and it is desirable to withdraw them from the crankcase as they are formed. For this purpose it is known in the art to apply a conduit or tube to the upper part of the crankcase and connect this conduit or tube with the intake manifold of the engine so that the suction of the manifold will withdraw vapors through the tube or conduit and pass the vapors into the combustion chamber from where they are expelled in due process from the exhaust valve of the engine and out of the exhaust pipe.

When the throttle valve of the carburetor is very near its open position, such as maintains when the engine is climbing steep hills or at very high speeds, the suction of the manifold, or the difference in air pressure between the atmosphere and that existing in the manifold, is not very great so that the force with which the manifold suction draws air through the conduit from the crankcase is not particularly high and there is no reason for restricting the conduit. At such times also the amount of blow-by is a maximum, requiring more ventilation. However, when the difference in the pressure between the atmosphere and the manifold reaches as much as three inches of mercury, the pull of the manifold will be much greater, and to avoid an excess of air being drawn into the manifold and decreasing the efficiency of the carburetor mixture it is desirable to restrict the crankcase ventilation conduit to prevent excess non-combustible air from reaching the manifold.

When the throttle of the carburetor is in idling position, the difference in pressure between the outside and the manifold is relatively high and at times attains a value of as much as fifteen inches of mercury or more. In the case of such a large difference between the outside pressure and the pressure existing in the manifold, at a time when the demand for mixture is small, there will be a great tendency to draw a large quantity of air through the ventilating tube into the manifold which would seriously upset carburetion by excessive dilution of the mixture. To decrease this tendency and diminish the quantity of air it is necessary further to restrict the conduit, but not totally to close the conduit so that some ventilation is obtained for the crankcase at all speeds.

It is the object of the present invention to design a flow control means or member which can be placed in the conduit between the crankcase and the manifold and which flow control member contains a valve which will be moved toward closed position by the force of the air flow through the conduit as soon as a differential of three inches of mercury exists between the pressure in the manifold and atmosphere pressure. When the difference in manifold pressure reaches as high as twelve inches of mercury, the valve of the flow control member is so designed that it will be fully on its seat, and what ventilation is obtained through the conduit is passed through an opening in the valve. This opening is unrestricted and remains constant at all times and is unaffected by any part of the apparatus. At low speeds, therefore, or when the throttle valve is in its nearly closed position, the crankcase ventilation will be obtained through the opening in the valve only.

The invention is disclosed on the accompanying drawing in which.

Figures 1, 2, 3, 4, 5:
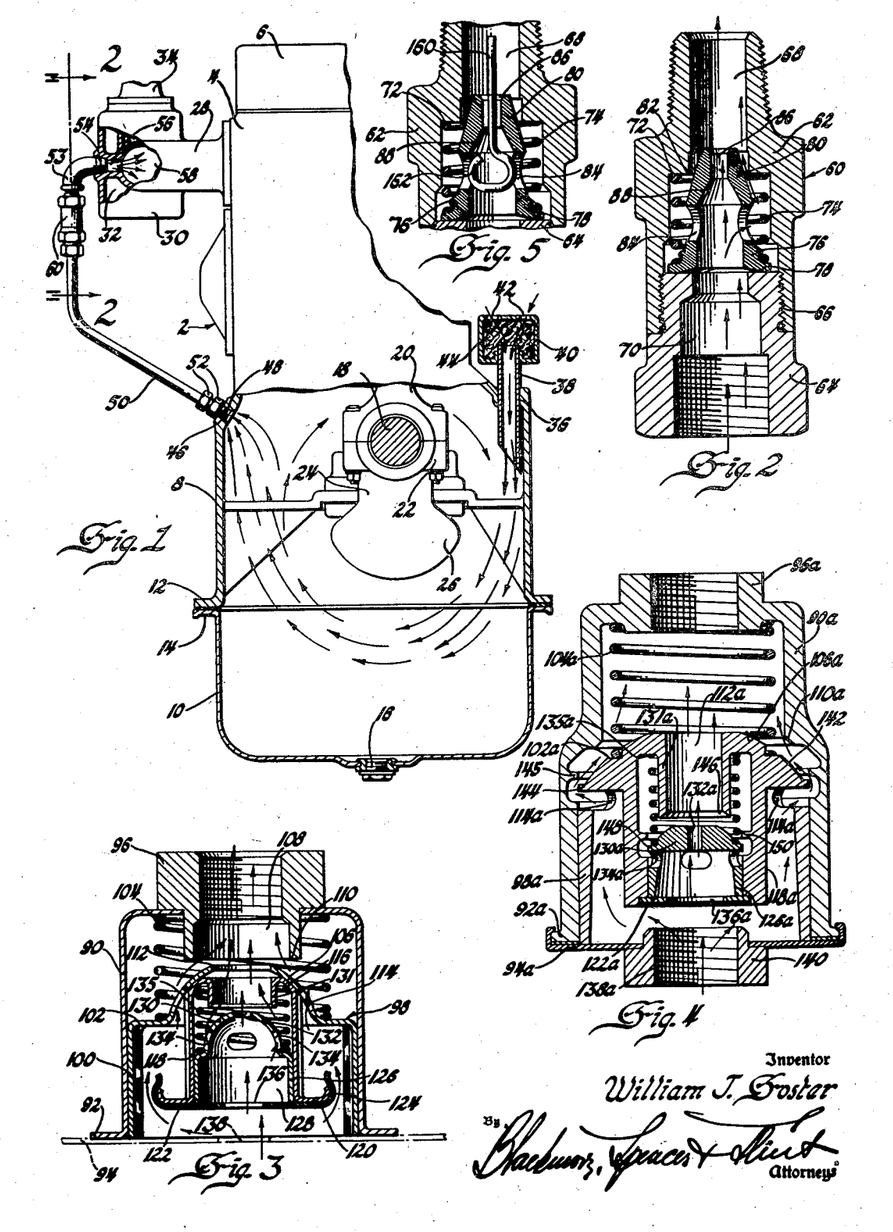
Figure 1 is an end view of an automobile engine with parts broken away and shown in section, and showing the invention applied.
Figure 2 is a section through the flow control member taken on the line 2—2 of Figure 1.
Figures 3, 4, and 5 are sectional views corresponding to Figure 2 of modifications of the invention.

On the drawing, the numeral 2 indicates an internal combustion engine as a whole. The engine has the cylinder block 4, the cylinder head 6, the crankcase 8, and the oil pan 10. The crankcase 8 and oil pan 10 are connected at flanges 12 and 14, respectively, through which are passed suitable bolts (not shown). The oil pan is provided with the usual drain plug 16.

A crankshaft 18 is mounted in the usual bearings inside the engine and to the shaft there are connected the usual connecting rods 20 secured to the crankshaft by means of the cap 22. The crankshaft has the usual crank throws 24 and the usual counterweights 26.

The intake manifold of the engine is indicated at 28. The manifold is provided with the usual heating device 30 at its mid-portion, the heating device being adapted to receive exhaust gases which circulate in the space indicated at 32. At the top or mid-part of the intake manifold the usual riser 34 is applied, and on top of the riser the usual downdraft carburetor (not shown) is applied.

The crankcase 8 has an opening 36 at one side and in this opening an air inlet tube 38 is applied. The tube has a shell 40 mounted on its upper end and openings 42 in the top of the shell allow the entrance of air. Any suitable filtering medium 44 is applied inside the shell 40 to filter the air before it reaches the crankcase.

At the opposite side of the crankcase there is a second opening 46 in which there is suitably secured as by the screw thread 48 one end of a conduit or tube 50. This tube is held to the opening 46 by means of nuts 52.

The other end 53 of the tube is screw threaded as indicated at 54 and is screwed into a passage 56 in the heater section 30 of the manifold. This passage 56 delivers directly to the interior 58 of the manifold.

Intermediate the tube or conduit 50 a flow control member or means 60 is applied, the purpose of which is to regulate the flow of air and entrained vapor or gases from the crankcase to the manifold. The manner in which the air enters the inlet tube 38, swirls in the crankcase and passes to the ventilating conduit 50 and then into the manifold is indicated in a general way by the arrows in Figure 1.

The flow control member 60 is indicated in section in Figure 2. This member comprises the upper shell 62 and the lower plug 64. The plug 64 is screw threaded into the shell as indicated at 66. The shell has a bore or passage 68 to allow the passage of air while the plug 64 likewise has a bore 70 to enable the air to pass through the flow control member.

The shell 62 is provided with a shoulder 72 against which there is seated a coil spring 74. A hollow valve 76 in the flow control member has a lower flange 78 freely seated on the end of the plug 64. On the top of the flange 78 the other end of the spring 74 rests. The spring 74 is under compression and always urges the valve to the position shown in Figure 2. In this position the valve is open and the flange 78 rests on the end of the plug 64. As shown in Figures 2 and 5, the lower surface of the flange 78 is spaced at its inner part from the end of the plug 64. This will enable the airflow to exert pressure against a larger part of the lower face of the flange when the flange is on its seat.

The upper part 80 of the valve 76 is conical and extends upwardly into the lower part of the bore 68. The lower edge 82 of the bore forms the valve seat for the cone 80 of the valve. The valve is also provided with the lateral openings 84 for the passage of air. In the position shown in Figure 2, which is the position corresponding to a low difference in pressure between the intake manifold and the atmosphere, or a pressure difference corresponding to less than approximately three inches of mercury, the air from the crankcase will pass through the bore 70 in the plug 64 through the openings 84 in the valve side and then between the space between the conical part 80 of the valve and its seat 82. The air will also pass through the hollow valve and out of an opening 86 in the top of the valve.

The inflow of air in the direction of the arrow shown in Figure 2 will impact against the bottom of the valve and also against the inclined part indicated at 88, and the force of the air flow is such that it will not begin to affect or overcome the spring until a pressure differential of about three inches of mercury exists between the atmosphere and the intake manifold. Over three inches of mercury, the air flow is sufficiently strong to begin compressing the spring which will push the conical part 80 of the valve upwardly into the bore 68 and restrict the space between the cone and the valve seat 82. This will begin to diminish the amount of air which may pass through the flow control. As the difference in pressure between the manifold and the atmosphere increases, the spring will be further compressed by the force of the flow of air, and when a pressure differential of about twelve inches of mercury is reached, the spring will be compressed to an extent where the cone 80 is pressed against its seat to close the air flow space between the valve and its seat. The flow control then will permit the flow of air through the opening 86 in the valve only. This is desirable for the reason that at high differences in pressure between the manifold and the outside the pull or suction of the manifold will be much greater, and if the ventilating conduit were not restricted there would be too much air drawn into the manifold and diminish the effective force of the carburetor mixture.

When the difference in pressure between the manifold and the atmosphere is low (three inches of mercury or less), the pull of the manifold is not very great and the space in the flow control can be larger to enable a sufficient quantity of air to pass to give adequate ventilation.

In the species of Figure 3, instead of the single valve of Figure 2, two valves are used, but the result is substantially the same. The flow control member of Figure 3 comprises the outer shell 90 having a lower flange 92 to secure it to a suitable plate 94 to which the conduit 50 may be attached. The upper end of the shell 90 has an opening in which a fitting 96 is applied. This fitting is screw threaded to receive the part 53 of the conduit which joins onto the manifold.

Inside the shell 90 there is slidably mounted the valve 98. This valve has the lateral arms 100 to guide it in the shell and a shoulder 102 to form a seat for a coil spring 104 which is confined between the inside end of the shell and the shoulder 102. The valve 98 has the upper rounded dome part 106 which is adapted to seat against the inside of a bore 108 in the fitting 96. The edge of the bore is preferably rounded or chamfered as indicated at 110 to adapt it to fit onto the dome 106. The valve 98 has the opening 112 at its top and a plurality of lateral openings 114 all of which are for the passage of air.

Inside the dome 106 there is secured as at 116 a second shell 118 having a flange 120 at its bottom. The flange is rounded at its edge and there is secured thereon as by a snap engagement the lower plate 122 which has the edge flange 124 to snap over the rounded edge of the flange 120.

Inside the shell 118 there is slidably mounted the valve 126. This valve has the lower skirt portion 128 to guide it in the shell 118 and the upper dome 130 which is adapted to seat against an inner beveled edge of a downwardly directed annular flange 131 at the upper end of the shell 118. The dome 130 is provided with the central opening 132 and the lateral openings 134 all of which openings are to enable the passage of air. A spring 135 is positioned between a shoulder on the valve 126 and the upper part of the shell 118.

The plate 122 has the air passage opening 136 while the plate 94 has the air passage opening 138. The air passes through the flow control in the manner indicated by the arrows.

The air from the conduit 50 entering the opening 138 impinges against the plate 122 and also against the lower part of the shoulder 102 to tend to press the valve 98 upwardly (when considering Figure 3). The movement of the air through the opening 138 will also impact against the underside of the valve 130 and constantly urge both valves to closed position. The spring 104 is much weaker than the spring 135 and both springs constantly tend to urge the valves to open position or to the position shown in Figure 3. The spring 104 is of such a strength that it will not be compressed until there is a difference of about three inches of mercury between the manifold and the atmosphere. With this difference in pressure, the force of the air flow is sufficiently strong to compress the spring 104 and move the valve 98 to cause the dome 106 to be pressed against the seat 110 on the fixture 96. This will close the openings 114 to the passage of air and will restrict the amount of air passing to the manifold to that flowing through the openings 132 and 134.

When the degree of vacuum, or the differential in pressure between the manifold and the atmosphere, reaches as much as approximately twelve inches of mercury, the force of the air flow is then sufficiently strong to move the valve 126 and compress the spring 135 to cause the dome 130 to be pressed against its seat on the annular flange 131. Both valves are now seated or closed, and in this position the air will be prevented from passing through the openings 134 and between the valves and their seats so that when a pressure differential of approximately twelve inches of mercury or more exists between the manifold and the atmosphere, the ventilation through the conduit 50 will be allowed through the opening 132 only. Therefore, the greater the degree of pressure differential between the manifold and the atmosphere, the greater the restriction of the conduit. This is necessary because with a large differential in pressure the manifold suction or pull will be so strong that it will cause an excess of air to be withdrawn from the crankcase and dilute the carburetor mixture to an extent that it will be objectionable. On the other hand, when the pressure differential between the manifold and the outside is low, such as at nearly closed throttle positions, the pull of the manifold, or suction, is relatively low and the air passage in the flow control member may be at its maximum.

In the species of Figure 4 there is a shell or casting 90a having an upper extension 96a which joins onto the upper end 53 of the conduit 50. The casting 90a has the lower flange 92a to which there is secured the plate 94a. The plate 94a is provided with the fitting 140 which has a threaded opening 138a to receive the tube 50 and to allow the passage of air. Inside the casting 90a there is slidably mounted a valve 98a, this valve having a dome-shaped upper part or head 106a provided with a shoulder 102a on which there is received a spring 104a. The spring is confined between the shoulder 102a and the upper inner part of the casting 90a. The dome-shaped part is suitably shaped at 142 to form a seat which is adapted to mate with a corresponding beveled part 110a on the interior of the casting 90a. The valve 98a is provided with the lateral openings 114a to allow the passage of air from the inside of the valve past the space between the valve seat 142 and the seat 110a on the casting.

At the lower edge of the dome-shaped part 106a, the dome is provided with an annular flange 144 forming a land. The interior of the casting 90a adjacent the land 144 is also provided with an inwardly extending flange 145 which also forms a land. In the open position of the valve 98a the land 144 is slightly below or out of alignment with the land 145.

The valve 98a has the downwardly extending part 118a at its center, and in this downwardly extending part a second valve 126a is slidably mounted. The valve 126a is held in the downwardly extending part 118a by means of the lower plate 122a secured in a recessed part at the lower end of the downwardly extending cylindrical part 118a. The valve 126a is provided with a dome 130a having a rounded upper part forming a valve seat, and this rounded part is adapted to seat on the lower inner beveled edge 146 of a cylindrical extension 131a extending downwardly from the dome 106a. A spring 135a is confined between the upper part of the dome 106a and a seat at the outer edge of the dome 130a. The dome 130a is provided with lateral air openings 134a and also with an annular flange 148 comprising a land. This annular flange 148 is adapted to cooperate with a second annular inwardly extending flange 150 on the interior of the valve 118a. The part 150 also forms a land. The valve 118a has the air opening or passage 112a while the valve 126a has the air opening or passage 132a.

In Figure 4 there is shown the position of the parts when there is a degree of vacuum or pressure differential between the manifold and the outside of about three inches of mercury or less. With such a low pressure differential, the pull or suction of the manifold is not very great and the flow of air will not be very fast so that there is no reason for restricting the openings in the flow control. The air now may pass through the opening 138a and through the various passages of the species of Figure 4, as indicated by the arrows. The spring 104a is much weaker than the spring 135a and when the degree of manifold vacuum or pressure differential between the manifold and the atmosphere reaches as much as approximately three inches of mercury, the force of the air drawn through the flow control will impact against the plate 122a, the bottom of the dome 106a, and the bottom of the dome 130a, and be sufficiently strong to cause the valve 98a to move against the force of the spring 104a and compress the spring to cause the lands 144 and 145 to coincide or be in the same plane and a short time later to push the seat 142 of the dome 106a against the seat 110a on the interior of the casting 90a. This will close the space between the seats 142 and 110a and prevent air from passing therethrough. The ventilation from the crankcase will now come through the openings 138a, 134a, and 132a, the passage therefor being much restricted.

The aforementioned condition will maintain until there is a differential in pressure between the manifold and the atmosphere equivalent to approximately twelve inches of mercury. When this differential in pressure exists, the force of flow of air through the flow control is sufficiently strong to push the valve 126a upward against the force of the spring 135a to compress the spring, to cause the lands 148 and 150 to coincide or be in the same plane, and to cause the dome 130a to seat against the beveled seat 146 on the extension 131a of the valve 98a further to restrict the openings through which the air may pass from the crankcase to the manifold. When such a degree of vacuum has been reached, the sole passage to allow the air to pass from the crankcase to the manifold is through the opening 132a.

After the initial closing movement of the valves 98a or 126a, the lands 144, 145 or 148, 150 will commence to register or be in the same plane. When this condition of coincidence is reached, the air passage across the lands will be restricted suddenly to cause the force of the air flow to be exerted all the stronger against the underside of the dome at the land 144 and against the plate 122a and the dome 130a to give a piston action or effect to the valves 106a or 130a. This will give somewhat of a snap action to the valves and cause them suddenly to move on to their seats as soon as the lands are in alignment to cause a quick closing of the air passage past the valve seats. These lands therefore make the flow control means more sensitive to changes in pressure differential between the manifold and the atmosphere.

When the valves are closed and the manifold suction drops to three inches of mercury, the spring 104a will expand to open the valve 98a. The lands being in registration at the start of the movement of the valve to open position, the spring 104a will give to the valve 98a enough initial movement so that its inertia will carry its land 144 past the land 145 to give a quick opening movement to the valve.

As in the species of Figures 2 and 3, when the degree of vacuum in the manifold or when the pressure differential between the manifold and the outside is low, there is no reason for restricting the opening in the flow control because the pull or suction of the manifold is not great and the movement of air will not be very fast so that a proper and adequate amount of ventilation is obtained through the flow control. However, when the degree of vacuum or the pressure differential between the manifold and atmosphere is relatively high, such as twelve inches of mercury, the pull or suction of the manifold is great and if the flow control did not restrict the ventilating conduit there would be too much air drawn from the crankcase and too much delivered to the manifold. Accordingly, with higher differentials in pressure, the flow control restricts the passage through the conduit to prevent an excess amount of air being drawn through the crankcase and being delivered to the manifold.

Figure 5 is a modification of the species of Figure 2 and differs from the structure of Figure 2 by the addition of a pin 160, the stem of which passes through the opening 86. The pin may be of wire and has a head 162 bent to the shape shown or to any other suitable shape which will prevent it from passing out of the valve 76, but will allow a certain amount of to and fro movement to the pin. The purpose of the pin is to prevent any foreign matter from plugging or clogging the opening 86. The movement of the valve and the force of flow to the air will cause a relative movement between the valve and the pin and this relative movement will cause a loosening of any matter adhering in the opening 86. When a pin 160 is used the opening 86 is made correspondingly larger so as not to restrict the opening.

With all of the species, the following facts are maintained:

1. The size of the openings 86, 132 and 132a is determined by the maximum amount of air which can be permitted to enter the intake manifold without upsetting good idling of the engine.

2. The amount of impact, or force of flow of the air, is regulated by the size of various openings and passages, such as the openings 136 or 136a.

In the claims, the term manifold suction refers to the suction in that part of the fuel feeding system of an internal combustion engine which is between the throttle of the carburetor and the inlet valves to the cylinders of the engine.

I claim:

1. In a flow control for the ventilation system of the crankcase of an internal combustion engine as applied to the engine manifold, said flow control comprising two movable valves in the path of flow of the air and springs mounted in the flow control, one spring for each valve urging its respective valve to open position, one of said springs being stronger than the other, the weaker spring being insufficiently strong to overcome a manifold suction of approximately three inches of mercury and being compressed by the movement of the valve to closed position by the air flow when the manifold suction is approximately three inches or more to decrease the size of the passage in the conduit, said stronger spring being insufficiently strong to overcome a manifold suction of approximately twelve inches of mercury and being compressed by the movement of the second valve to closed position by the air flow when the suction in the manifold reaches approximately twelve inches or more, and the closing of said second valve further decreasing the size of the air passage in the conduit.

2. The invention of claim 1, each of said valves having an unrestricted opening always to allow the passage of some air through the conduit.

3. In a flow control for ventilation system of the crankcase of an internal combustion engine as applied to the engine manifold, said flow control comprising a housing, a valve slidably mounted in the housing, a spring between the valve and the housing constantly urging the valve to open position, a second valve slidably mounted on the first valve, and a second spring between the two valves constantly urging the second valve to open position, said first mentioned spring being insufficiently strong to overcome a manifold suction of approximately three inches of mercury, said first valve closing against the strength of its spring when the manifold suction is approximately three inches of mercury or more, the closing of said first valve restricting the air passage in the conduit, said second named spring being insufficiently strong to overcome a manifold suction of approximately twelve inches of mercury, and said second valve closing against the strength of the spring when the manifold suction is approximately twelve inches of mercury or more further to restrict the air passage in the conduit.

4. The invention of claim 3, each of said valves having an unrestricted opening always to allow the passage of some air through the conduit.

5. In a flow control for the ventilating system of the crankcase of an internal combustion engine as applied to the engine manifold, a movable valve mounted in said flow control, a spring mounted in said flow control and acting on said valve and constantly urging said valve to open position, said spring being insufficiently strong to overcome a manifold suction of approximately three inches of mercury and being compressed by the movement of the valve to closed position caused by the air flow when the degree of suction is approximately three inches of mercury or more, the closing of the valve restricting the air passage in the conduit, and adjacent lands on said valve and said flow control member, said lands being out of register or non-coplanar when the valve is open and the land on said valve moving into a coplanar position with the land on the flow control member to restrict the flow of air past the lands to cause the force of the air flow to move the valve faster to closed position.

6. In a flow control for the ventilating system of the crankcase of an internal combustion engine as applied to the engine manifold, a passage through said flow control, valve means movably mounted in the flow control, spring means constantly urging said valve means to open position, the force of flow of the air through the flow control against the valve means produced by manifold suction causing the valve means to move and the spring means to be compressed to restrict the passage through the flow control, said spring means having a strength sufficiently strong to resist a force of air flow produced by a manifold suction of three inches of mercury or less and insufficiently strong to withstand a force produced by a manifold suction of twelve inches of mercury or more, a land in the flow control, and a land on said valve means, the land on the valve means being non-coplanar with the land on the flow control when the valve means is open but moving to mating or coplanar position as the valve means closes, and the beginning of the mating or coplanar position of the lands restricting the air passage between the lands to cause the flow of air to act on the valve means to move the valve means faster or by a snap action to closed position.

7. In a flow control for the ventilating system of the crankcase of an internal combustion engine as applied to the engine manifold, a passage through said flow control, a plurality of valves movably mounted in the flow control and spring means for each valve constantly urging said valves to open position, the force of flow of the air through the flow control against the valves produced by manifold suction causing the valves to move and the spring means to be compressed to restrict the passage through the flow control, one of said spring means having a strength sufficiently strong to resist a force of air flow produced by a manifold suction of three inches of mercury and the other of said spring means having a strength insufficiently strong to withstand a force produced by a manifold suction of twelve inches of mercury or more.

8. In a flow control for the ventilating system of the crankcase of an internal combustion engine as applied to the engine manifold, a passage through said flow control, two valves movably mounted in the flow control, one of said valves being mounted in the other valve, and spring means for each valve constantly urging said valves to open position, the force of flow of the air through the flow control against the valves produced by manifold suction causing the valves to move and the spring means to be compressed to restrict the passage through the flow control, one of said spring means having a strength sufficiently strong to resist a force of air flow produced by a manifold suction of three inches of mercury and the other of said spring means having a strength insufficiently strong to withstand a force produced by a manifold suction of twelve inches of mercury or more.

9. In a flow control for the ventilating system of the crankcase of an internal combustion engine as applied to the engine manifold, a passage through said flow control, a plurality of valves movably mounted in the flow control, spring means for each valve constantly urging said valves to open position, the force of flow of the air through the flow control against the valves produced by manifold suction causing the valves to move and the spring means to be compressed to restrict the passage through the flow control, one of said spring means having a strength sufficiently strong to resist a force of air flow produced by a manifold suction of three inches of mercury and the other of said spring means having a strength insufficiently strong to withstand a force produced by a manifold suction of twelve inches of mercury or more, a land in said flow control, and a cooperating land on one of said valves, the land on the valve being non-coplanar with the land in the flow control when the valve is in open position but moving to mating or coplanar position as the valve closes, and the beginning of the mating or coplanar position of the lands restricting the air passage between the lands to cause the flow of air to act on the valve to move the valve faster or by a snap action to close position.

10. In a flow control for the ventilating system of the crankcase of an internal combustion engine as applied to the engine manifold, a passage through said flow control, a plurality of valves movably mounted in the flow control, spring means for each valve constantly urging said valves to open position, the force of flow of the air through the flow control against the valves produced by manifold suction causing the valves to move and the spring means to be compressed to restrict the passage through the flow control, one of said spring means having a strength sufficiently strong to resist a force of air flow produced by a manifold suction of three inches of mercury and the other of said spring means having a strength insufficiently strong to withstand a force produced by a manifold suction of twelve inches of mercury or more, a land in said flow control, and a cooperating land on one of said valves, the land on the valve being non-coplanar with the land in the flow control when the valve is in open position but moving to mating or coplanar position as the valve closes, the beginning of the mating or coplanar position of the lands restricting the air passage between the lands to cause the flow of air to act on the valve to move the valve faster or by a snap action to closed position, and said mating or coplanar position of the lands causing the valve to open suddenly or by a snap action when the manifold pressure increases.

11. In a flow control for the ventilating system of a crankcase of an internal combustion engine as applied to the engine manifold, a passage through said flow control open at all times to enable a quantity of air to pass therethrough, a first valve mounted in said flow control and movable to and from a closed position, a first spring constantly urging said valve to open position, a second valve mounted in said first valve and movable to and from a closed position, and a second spring constantly urging said second valve to open position, said valves being moved toward closed position by the flow of air through the flow control produced by manifold suction, one of said springs having a strength sufficiently strong to resist a force of air flow produced by a manifold suction of three inches of mercury or less and the other spring having a strength insufficiently strong to overcome a force produced by manifold suction of twelve inches of mercury or more, lateral openings in the valves to enable the passage of air through the flow control, and said openings being closed to the passage of air when the valves are in closed position.

12. In a flow control for the ventilating system of a crankcase of an internal combustion engine as applied to the engine manifold, a passage through said flow control open at all times to enable a quantity of air to pass therethrough, a first valve mounted in said flow control and movable to and from a closed position, a first spring constantly urging said valve to open position, a second valve mounted in said first valve and movable to and from a closed position, a second spring constantly urging said second valve to open position, said valves being moved toward closed position by the flow of air through the flow control produced by manifold suction, one of said springs having a strength sufficiently strong to resist a force of air flow produced by a manifold suction of three inches of mercury or less and the other spring having a strength insufficiently strong to overcome a force produced by manifold suction of twelve inches of mercury or more, lateral openings in the valves to enable the passage of air through the flow control, said openings being closed to the passage of air when the valves are in closed position, and a plurality of cooperating lands inside the flow control operative to cause the valves to move with a snap action to a final closing position or from an initial opening position.

13. In a flow control for the ventilating system of the crankcase of an internal combustion engine as applied to the engine manifold, a passage through said flow control open at all times to enable a quantity of air to pass therethrough, an apertured plug in one end of the flow control, a valve in the passage in the flow control, said valve being normally positioned on the plug, a flange on said valve, and a spring in the flow control acting on said flange and constantly urging the valve toward open position, said valve being movable to closed position to restrict the passage by the force of flow of the air through the flow control, and said spring being uncompressed by the force of air flow produced by the manifold suction of substantially three inches of mercury but being compressed by a force of air flow slightly in excess of three inches of mercury.

14. The invention of claim 13, said flange being at the valve end portion adjacent the plug and said end portion having an inner part always spaced from the plug to enable the air flow to act on the valve to move it away from the plug toward closed position.

15. In a flow control for the ventilating system of the crankcase of an internal combustion engine as applied to the engine manifold, a passage through said flow control open at all times to enable a quantity of air to pass therethrough, an apertured plug in one end of the flow control, a valve in the passage in the flow control, said valve being normally positioned on the plug, and a spring in the flow control acting on said valve and constantly urging the valve toward open position, said valve being movable toward closed position to restrict the passage by the force of flow of the air through the flow control, said spring uncompressed by the force of air flow produced by the manifold suction of substantially three inches of mercury but being compressed by a force of air flow slightly in excess of three inches of mercury, and said spring being insufficiently strong to overcome the forces produced by manifold suction of twelve inches of mercury or more effective on said valve to cause it to be moved to fully closed position when the manifold suction is twelve inches of mercury or more.

16. In a flow control for the ventilating system of the crankcase of an internal combustion engine as applied to the engine manifold, a passage through said flow control open at all times to enable a quantity of air to pass therethrough, a valve seat, a valve in the passage in the flow control, said valve having no positive connection to the flow control and having a generally conical end adapted to extend into the valve seat and to fit thereagainst when the valve is in closed position, and a spring in the flow control acting on said valve and constantly urging the valve toward open position, said valve being moved toward closed position to restrict the passage by the force of flow of the air through the flow control, said spring being under such initial compression and having such characteristics that it is uncompressed by the force of air flow produced by the manifold suction of substantially three inches of mercury, but is compressed by a force of air flow slightly in excess of three inches of mercury, and the movement of said valve toward closed position causes the conical end to extend into its seat progressively to restrict and close the passage between the conical end and the seat.

17. In a flow control for the ventilation system of the crankcase of an internal combustion engine as applied to the engine manifold, said flow control having an air inlet and a bore for egress of air, a shoulder in said flow control, a spring seated on said shoulder, a movable valve in the flow control in the path of flow of the air from said inlet to said bore, said spring pressing against said valve and constantly urging it toward open position, and a tapered end on said valve, said tapered end extending into the bore of the flow control, said spring being uncompressed by the force of air flow against the valve produced by a manifold suction of approximately three inches of mercury or less, the flow of air causing said valve to begin to compress the spring and to cause the tapered end to approach the sides of the bore when the degree of suction is approximately three inches of mercury, said valve being seated against the sides of the bore to prevent the passage of air between the sides of the valve and the bore when the manifold suction is approximately twelve inches of mercury or more, and the movement of said valve toward its seat as the suction increases between approximately three and twelve inches of mercury causing the air flow in the flow control to be progressively restricted.

18. In a flow control for the ventilation system of the crankcase of an internal combustion engine as applied to the engine manifold, said flow control having an air inlet and a bore for egress of air, a shoulder in said flow control, a spring seated on said shoulder, a movable valve in the flow control in the path of flow of the air from said inlet to said bore, said valve having a passage open at all times to enable the flow of some air through the flow control, said spring pressing against said valve and constantly urging it toward open position, and a tapered end on said valve, said tapered end extending into the bore of the flow control, said spring being uncompressed by the force of air flow against the valve produced by a manifold suction of approximately three inches of mercury or less, the flow of air causing said valve to begin to compress the spring and to cause the tapered end to approach the sides of the bore when the degree of suction is approximately three inches of mercury, said valve being seated against the sides of the bore to prevent the passage of air between the sides of the valve and the bore when the manifold suction is approximately twelve inches of mercury or more, and the movement of said valve toward its seat as the suction increases between approximately three and twelve inches of mercury causing the air flow in the flow control to be progressively restricted.

19. In a flow control for the ventilation system of the crankcase of an internal combustion engine as applied to the engine manifold, a passage through the flow control, said passage being at least partially open at all times, a movable valve in said flow control, a seat in the flow control for said valve when in closed position, and spring means in the flow control acting on the valve and constantly urging the valve toward open position, said valve being in the path of flow of the air through said passage and being moved toward closed position by the flow of the air through said passage when the force of the flow overcomes the resistance of the spring means, said valve being moved to fully closed position when the suction in the manifold is equivalent to approximately twelve inches of mercury, the movement of said valve toward closed position progressively restricting the passage between the valve and its seat to restrict the flow of air through the flow control.

20. In a flow control for the ventilating system of the crankcase of an internal combustion engine as applied to the engine manifold, a passage through said flow control, valve means movably mounted in the flow control, and spring means constantly urging said valve means toward open position, the force of flow of the air through the flow control against the valve means produced by manifold suction causing the valve means to move and the spring means to be compressed to restrict the passage through the flow control, and said spring means preventing movement of the valve toward closed position for a force of air flow produced by a manifold suction of approximately three inches of mercury or less and being compressed sufficiently by a force of air flow against the valve produced by a manifold suction of twelve inches of mercury or more to cause the valve to move to fully closed position.

21. In a flow control for the ventilating system of the crankcase of an internal combustion engine as applied to the engine manifold, a passage through said flow control open at all times to enable a quantity of air to pass therethrough, an apertured member at the outlet end of the flow control, a movable valve in the passage in the flow control, said valve in open position being positioned adjacent the apertured member but having no positive connection to the flow control, and resilient means in the flow control acting on said valve and constantly urging the valve toward open position, said valve being movable toward closed position by the force on the valve of flow of the air through the flow control, the movement of said valve toward closed position gradually restricting the passage, and said resilient means being uncompressed by the force on the valve of air flow produced by manifold suction of substantially three inches of mercury but being compressed by a force of air flow produced by manifold vacuum slightly in excess of three inches of mercury.

22. In a flow control for the ventilating system of the crankcase of an internal combustion engine as applied to the engine manifold, a passage through said flow control open at all times to enable a quantity of air to pass therethrough, an apertured member at the inlet end of the flow control, a movable valve in open position in the passage in the flow control, said valve being positioned adjacent the apertured member but having no positive connection to the flow control, and a spring in the flow control acting on said valve and constantly urging the valve toward open position, said valve being movable toward closed position by the force on the valve of flow of the air through the flow control, the movement of said valve toward closed position gradually restricting the passage, said spring being uncompressed by the force on the valve of air flow produced by manifold suction of substantially three inches of mercury but being compressed by a force of air flow produced by manifold vacuum slightly in excess of three inches of mercury, and said valve having therethrough an air passage which at all times is open and discharges air into the outlet of the passage in the flow control, said passage through the valve having its outlet smaller than its inlet.

23. In combination with a crankcase ventilating system of an internal combustion engine having a conduit providing communication from the crankcase to the manifold of the engine, a flow control device in said conduit comprising a casing having a chamber formed with an inlet opening and an outlet opening alined with the inlet opening, a valve in said chamber in the path of fluid flow between the inlet and outlet openings and movable to control fluid flow through said device, said valve being smaller in transverse cross-section than said chamber and being formed with a through passage in alinement with the chamber inlet and outlet openings, said chamber having a seat for said valve adjacent said outlet opening, and said passage through the valve having a lateral opening providing communication from said passage to the part of the chamber about said valve; and pre-stressed resilient means engaging said valve and biasing it toward the inlet opening of said chamber, said resilient means being constructed to withstand the force of fluid flow through said chamber produced by manifold vacuum of less than approximately three inches of mercury and to be overcome progressively by increasing manifold vacuum of more than approximately three inches of mercury until completely overcome by manifold vacuum of approximately twelve inches of mercury or more, and the outlet opening of the valve passage communicating with the chamber outlet opening in all positions of the valve.

24. In combination with a crankcase ventilating system of an internal combustion engine having a conduit providing communication from the crankcase to the manifold of the engine, a flow control device in said conduit comprising a casing having a chamber formed with an inlet bore and an outlet bore alined with the inlet bore; a valve movable in said chamber to control fluid flow through said device and having an end portion at all times within said outlet bore, said valve being smaller in transverse cross-section than said chamber but greater in length than the space between said bores and being formed with a through passage in alinement with the chamber inlet and outlet bores, said chamber having a seat for said valve adjacent said outlet bore, and said passage through the valve having an inlet portion and an outlet portion substantially smaller than said inlet portion with a tapered intermediate portion connecting the inlet and outlet portions and with a lateral opening providing communication from said passage to the part of the chamber about said valve; and prestressed spring means engaging said valve and biasing it toward the inlet bore of the chamber, said spring means being constructed and calibrated to withstand the force of fluid flow through said chamber produced by manifold vacuum of less than approximately three inches of mercury and to be overcome progressively by increasing manifold vacuum of more than approximately three inches of mercury until said valve is forced on said seat by manifold vacuum of approximately twelve inches of mercury or more.

25. In combination with a crankcase ventilating system of an internal combustion engine having a conduit providing communication from the crankcase to the manifold of the engine, a flow control device in said conduit comprising a chamber formed with an inlet opening and an outlet opening in alinement with the inlet opening; a valve movable in said chamber to control fluid flow through said device, said valve being smaller in transverse cross-section than said chamber and being formed with a through passage in alinement with the chamber inlet and outlet openings, said chamber having a seat for said valve adjacent said outlet opening, and said passage through the valve having an inlet portion and an outlet portion substantially smaller than said outlet portion with a lateral opening in the valve providing communication from said passage to the part of the chamber about said valve; prestressed resilient means engaging said valve and biasing it toward the inlet opening of the chamber, said resilient means being constructed to withstand the force of fluid flow through said chamber produced by manifold vacuum of less than approximately three inches of mercury and to be overcome progressively by increasing manifold vacuum of more than approximately three inches of mercury until said valve is forced on said seat by manifold vacuum of approximately twelve inches of mercury or more; and a pin having a stem extending loosely through the outlet portion of the valve passage and also having a bulged-out part loosely supported in said lateral opening of the valve, said passage through the valve at all times providing communication between the inlet and outlet openings of the chamber.

26. A flow control device adapted for use in a ventilating conduit providing communication from the crankcase of an internal combustion engine to its manifold and comprising a chamber formed with two spaced alined openings, an inlet bore leading to one of said openings and an outlet bore leading from the other of said openings; a valve movable in said chamber to control flow through said device and smaller in transverse cross-section than said chamber but greater in length than the space between said openings, said valve having an inlet end portion the end of which is adapted to abut the chamber wall about said one opening, an outlet end portion formed with an elongated conical surface extending within said outlet bore in all positions of said valve and adapted to seat on said other opening, a through passage which adjacent said inlet end portion is substantially larger in area than adjacent said outlet end portion, and a lateral opening providing communication between said passage and the part of the chamber about said valve; and prestressed resilient means engaging said valve and biasing it toward said inlet bore; whereby, when pressure differential and flow between said bores are sufficient to overcome said resilient means completely and seat the valve on said other opening, flow into said outlet bore will occur only through said outlet end portion of the valve for minimum flow and, when pressure differential and flow between said bores are insufficient to overcome said resilient means completely, flow into said outlet bore will occur through said outlet end portion of the valve and also through said lateral opening and about the outlet end portion of the valve for maximum flow, flow between minimum and maximum and varying with the pressure differential between said bores being obtained when the pressure differential and flow between said bores is sufficient only partially to overcome said resilient means.

27. A flow control device adapted for use in a ventilating conduit providing communication from the crankcase of an internal combustion engine to its manifold and comprising a chamber formed with two alined openings, an inlet bore leading to one of said openings and an outlet bore leading from the other of said openings; a valve movable in said chamber to control flow through said device and smaller in transverse cross-section than said chamber, said valve having an inlet end adapted to abut the chamber wall about said one opening with an abutting surface substantially smaller than the difference in the areas enclosed by the peripheries of said inlet end and of said one opening, an outlet end portion formed with a conical surface adapted to seat on said other opening, a through passage providing communication at all times between said bores, and a lateral opening providing communication at all times between said passage and the part of the chamber about said valve, and the passage through said valve having an inlet and an outlet which is substantially larger in area than said inlet with a conical surface portion therebetween; and pre-stressed spring means engaging said valve and biasing it toward said inlet bore; whereby, when pressure differential and flow between said bores are sufficient to overcome said spring means completely and seat the valve on the chamber opening for the outlet bore, flow into said outlet bore will occur only through said outlet of the valve passage and, when pressure differential and flow between said bores are insufficient to overcome said spring means completely, flow into said outlet bore will occur through said outlet of the valve passage and also about the outlet end portion of the valve, the amount of flow about the outlet end portion of the valve varying with the pressure differential between said bores when the pressure differential and flow overcome said spring means only partially.

28. A flow control device adapted for use in a ventilating conduit providing communication from the crankcase of an internal combustion engine to its manifold and comprising a chamber formed with two alined openings in opposite walls, an inlet bore leading to one of said openings and an outlet bore leading from the other of said openings; a valve movable in said chamber to control flow through said device, and smaller in transverse cross-section than said chamber but greater in length than the space between said openings, said valve having an inlet end portion substantially larger in area than said one opening and adapted to abut the chamber wall about said one opening, an outlet end portion formed with an elongated frustro-conical surface extending within said outlet bore in all positions of said valve and adapted to seat on said other opening, a through passage which adjacent said inlet end portion is substantially larger in area than adjacent said outlet end portion with an intermediate surface of frustro-conical form, and a lateral opening providing communication between said passage and the part of the chamber about said valve, and the inlet end portion of said valve having a peripheral flange and its end surface dished; and a coil spring under partial compression about said valve, said spring engaging said peripheral flange and the chamber wall about said other opening and biasing the valve toward said inlet bore; whereby, when pressure differential and flow between said bores are sufficient to overcome said spring completely and seat the valve on said other opening, flow into said outlet bore will occur only through said outlet end portion of the valve for minimum flow and, when pressure differential and flow between said bores are insufficient to overcome said spring completely, flow into said outlet bore will occur through said outlet end portion of the valve and also through said lateral opening and about the outlet end portion of the valve for maximum flow, flow between minimum and maximum and varying with the pressure differential between said bores being obtained when the pressure differential and flow between said bores is sufficient only partially to overcome said spring.

29. A flow control device comprising a chamber formed with two alined openings, an inlet bore leading to one of said openings and an outlet bore leading from the other of said openings; a valve movable in said chamber to control flow through said device and biased toward said inlet bore, said valve having a smaller transverse cross-section than said chamber, an inlet end portion adapted to be seated adjacent said one opening when the valve is in biased position, an outlet end portion provided with a surface adapted to seat adjacent said other opening and stop flow about said valve to said outlet bore when the biasing force acting on the valve is completely overcome, a through passage providing communication at all times between said bores, and a lateral opening providing communication between said passage and the part of the chamber about said valve; and a pin movably carried in the passage through said valve, the portion of said passage adjacent its inlet being substantially larger in area than the portion adjacent its outlet, the lateral opening from said passage being in the portion of the passage adjacent its inlet, and said pin having a stem loosely fitting in the portion of the passage adjacent its outlet and also having a part bulging out from the stem and loosely supported in said lateral opening.

30. In combination with a crankcase ventilating system of an internal combustion engine having a conduit providing communication from the crankcase to the manifold of the engine, a flow control device in said conduit comprising a casing having a chamber formed with an inlet opening and an outlet opening communicating with the inlet opening, a valve in said chamber between the inlet and outlet openings and movable to control fluid flow through said device, said valve being smaller in transverse cross-section than said chamber and being formed with a through passage in communication with the chamber inlet and outlet openings, said chamber having a seat for said valve adjacent said outlet opening, and said passage through the valve having a restricted portion near its outlet and a lateral opening providing communication from said passage to the part of the chamber about said valve; prestressed resilient means engaging said valve and biasing it toward the inlet opening of said chamber, said resilient means being constructed to withstand the force produced on said valve by manifold vacuum of less than approximately three inches of mercury and to be compressed by manifold vacuum of more than approximately three inches of mercury; and a pin having a stem extending loosely through the relatively restricted portion of said passage and also having a bulged-out part loosely supported in said lateral opening of the valve.

WILLIAM J. FOSTER.

REFERENCES CITED

The following references are of record in the file of this patent:

UNITED STATES PATENTS

| Number | Name | Date |
|---|---|---|
| 1,271,541 | Core et al. | July 9, 1918 |
| 2,120,050 | Lowther | June 7, 1938 |
| 2,139,801 | Boyce | Dec. 13, 1938 |
| 2,184,141 | Dodge | Dec. 19, 1939 |
| 2,254,064 | Dressler | Aug. 26, 1941 |
| 2,080,588 | Whittington | May 18, 1937 |
| 2,198,790 | Roddewig | Apr. 30, 1940 |
| 1,933,852 | Hahn | Nov. 7, 1933 |
| 1,640,615 | Niederche | Aug. 30, 1927 |
| 2,069,022 | Sisk | Jan. 26, 1937 |
| 814,285 | Gold | Mar. 6, 1906 |
| 414,493 | Chamberlain | Nov. 5, 1889 |
| 2,138,719 | Wright | Nov. 29, 1938 |
| 2,240,459 | McDowell | Apr. 29, 1941 |
| 2,359,485 | Lowther | Oct. 3, 1944 |

Certificate of Correction

Patent No. 2,423,592.                                                                                       July 8, 1947.

WILLIAM J. FOSTER

It is hereby certified that errors appear in the printed specification of the above numbered patent requiring correction as follows: Column 2, line 14, for the word "atmosphere" read *atmospheric*; column 12, line 1, claim 15, after "spring" insert *being*; line 7, same column and same claim, after "more" insert *and*; column 15, line 41, claim 25, for "outlet" read *inlet*; line 63, beginning with "26. A flow control" strike out all to and including the word and period "spring." in column 17, line 42, comprising claims 26, 27, and 28; column 18, lines 2, 3, and 4, claim 29, strike out the words and comma "the lateral opening from said passage being in the portion of the passage adjacent its inlet,"; for the claims now appearing in the patent as "29" and "30" read *26* and *27*; in the heading to the printed specification, line 8, for "30 Claims" read *27 Claims*; and that the said Letters Patent should be read with these corrections therein that the same may conform to the record of the case in the Patent Office.

Signed and sealed this 4th day of November, A. D. 1947.

[SEAL]

THOMAS F. MURPHY,
*Assistant Commissioner of Patents.*